US009717336B1

(12) United States Patent
Apple et al.

(10) Patent No.: US 9,717,336 B1
(45) Date of Patent: Aug. 1, 2017

(54) CHAIR WEDGE

(71) Applicants: James E. Apple, Marietta, GA (US); Claire R. Crose, Woodstock, GA (US)

(72) Inventors: James E. Apple, Marietta, GA (US); Claire R. Crose, Woodstock, GA (US)

(*) Notice: Subject to any disclaimer, the term of this patent is extended or adjusted under 35 U.S.C. 154(b) by 0 days.

(21) Appl. No.: 15/157,146

(22) Filed: May 17, 2016

(51) Int. Cl.
| | |
|---|---|
| *E05C 17/54* | (2006.01) |
| *A47B 91/12* | (2006.01) |
| *A47B 87/02* | (2006.01) |
| *A47C 4/00* | (2006.01) |
| *E05C 17/44* | (2006.01) |
| *E05B 3/00* | (2006.01) |
| *B60T 3/00* | (2006.01) |
| *B61H 13/00* | (2006.01) |
| *F16M 11/24* | (2006.01) |
| *A47B 91/00* | (2006.01) |
| *A47G 29/00* | (2006.01) |
| *B65D 19/00* | (2006.01) |

(Continued)

(52) U.S. Cl.
CPC .............. *A47B 91/12* (2013.01); *A47B 87/02* (2013.01); *A47C 4/00* (2013.01); *E05C 17/54* (2013.01); *A47B 91/02* (2013.01); *A47B 91/06* (2013.01); *A47B 91/16* (2013.01); *A47C 4/04* (2013.01); *A47C 7/002* (2013.01); *A47C 7/62* (2013.01); *B60T 3/00* (2013.01); *F16M 2200/08* (2013.01)

(58) Field of Classification Search
CPC .. A47C 7/002; A47C 7/02; A47C 4/04; A47C 7/62; F16M 11/24; F16M 11/247; F16M 11/36; E05C 17/54; E05B 17/2015; B60T 3/00; A47B 91/02; A47B 91/00; A47B 91/12; A47B 91/06

USPC .......... 248/188.1, 188.2, 188.8, 346.05, 677, 248/346.11, 668; 254/39, 88, 104; 292/342, 343, 355; 188/32, 36
See application file for complete search history.

(56) References Cited

U.S. PATENT DOCUMENTS

| 133,520 A | * | 12/1872 | Coles | ..................... F16M 13/00 |
|---|---|---|---|---|
| | | | | 248/346.5 |
| 342,970 A | * | 6/1886 | Ongley | ................. A47B 91/12 |
| | | | | 126/304 R |

(Continued)

OTHER PUBLICATIONS

Door stop found online at http://www.liapela.com/Door-Stop.html on Mar. 8, 2016.

(Continued)

*Primary Examiner* — Leslie A Nicholson, III
*Assistant Examiner* — Taylor Morris
(74) *Attorney, Agent, or Firm* — Crose Law LLC; Bradley D. Crose

(57) ABSTRACT

A chair wedge includes: a first tier having a downward sloped first top surface from a first tier top rear edge to a first tier top front edge; a second tier recessed within a center portion of the first tier and having a downward sloped second top surface from a second tier top rear edge to a second tier top front edge, and wherein the downward sloped second top surface is at a lesser angle relative to a base surface than is the downward sloped first top surface; a cavity formed in a space differential between the downward sloped first top surface and the downward sloped second top surface; and a rear wall defined at an inward most portion of the cavity and configured in combination with the cavity to stop a chair leg from further movement when placed within the chair wedge.

18 Claims, 12 Drawing Sheets

(51) Int. Cl.
| | | |
|---|---|---|
| *F16M 1/00* | (2006.01) | |
| *F16M 3/00* | (2006.01) | |
| *F16M 5/00* | (2006.01) | |
| *F16M 7/00* | (2006.01) | |
| *F16M 9/00* | (2006.01) | |
| *F16M 11/00* | (2006.01) | |
| *A47C 7/00* | (2006.01) | |
| *A47C 4/04* | (2006.01) | |
| *A47C 7/62* | (2006.01) | |
| *A47B 91/02* | (2006.01) | |
| *A47B 91/06* | (2006.01) | |
| *A47B 91/16* | (2006.01) | |

(56) References Cited

U.S. PATENT DOCUMENTS

| | | | | |
|---|---|---|---|---|
| 372,655 | A * | 11/1887 | Cashin | E05C 17/54 292/343 |
| 947,805 | A * | 2/1910 | Dumont | E05C 17/54 16/82 |
| 1,465,302 | A * | 8/1923 | Haskel | E05C 17/54 254/104 |
| 1,730,698 | A * | 10/1929 | Wagner, Jr. | A47B 91/12 248/346.11 |
| 1,915,320 | A * | 6/1933 | Jones | A47B 91/12 188/32 |
| 2,232,585 | A * | 2/1941 | Aldrich | B66F 7/243 188/32 |
| 3,265,159 | A * | 8/1966 | Worden | B60T 3/00 188/32 |
| 3,289,794 | A * | 12/1966 | Miles | B60T 3/00 188/32 |
| 3,301,352 | A * | 1/1967 | Corson | B60T 3/00 188/32 |
| 3,328,065 | A * | 6/1967 | Arenson | E05C 17/54 16/86 A |
| 3,734,241 | A * | 5/1973 | Hale | B60T 3/00 188/32 |
| 3,794,284 | A * | 2/1974 | Guenther | A47B 23/042 248/441.1 |
| 4,830,320 | A * | 5/1989 | Bellows | F16M 7/00 248/188.2 |
| 4,884,664 | A * | 12/1989 | Berg | B60T 3/00 188/32 |
| 5,249,767 | A * | 10/1993 | Mellen | F16M 7/00 248/188.2 |
| 5,257,803 | A * | 11/1993 | Fisher | A47B 91/12 248/346.01 |
| 5,427,339 | A * | 6/1995 | Pauli | B05B 15/00 188/32 |
| 5,967,605 | A | 10/1999 | Stanfield | |
| 6,164,608 | A * | 12/2000 | Schiel, Jr. | E06C 7/44 182/200 |
| 6,230,446 | B1 * | 5/2001 | Chalich | E06B 1/6069 16/17.1 |
| 6,622,960 | B2 * | 9/2003 | Hyde | B65H 57/00 137/377 |
| 6,866,338 | B2 | 3/2005 | Mendenhall et al. | |
| 7,040,461 | B2 * | 5/2006 | Chrisco | B60T 3/00 188/32 |
| 9,554,650 | B1 * | 1/2017 | Hubbard, Sr. | A47C 7/62 |
| 2007/0221799 | A1 * | 9/2007 | Hurley | F16M 7/00 248/188.2 |
| 2013/0292535 | A1 * | 11/2013 | Barja | A47B 91/12 248/346.11 |

OTHER PUBLICATIONS

Chair cart found online at http://www.staples.com/NPS-Under-Stage-Converter-Kit-For-DY-35-DY-Folding-Chair/product_310862 on Mar. 8, 2016.

* cited by examiner

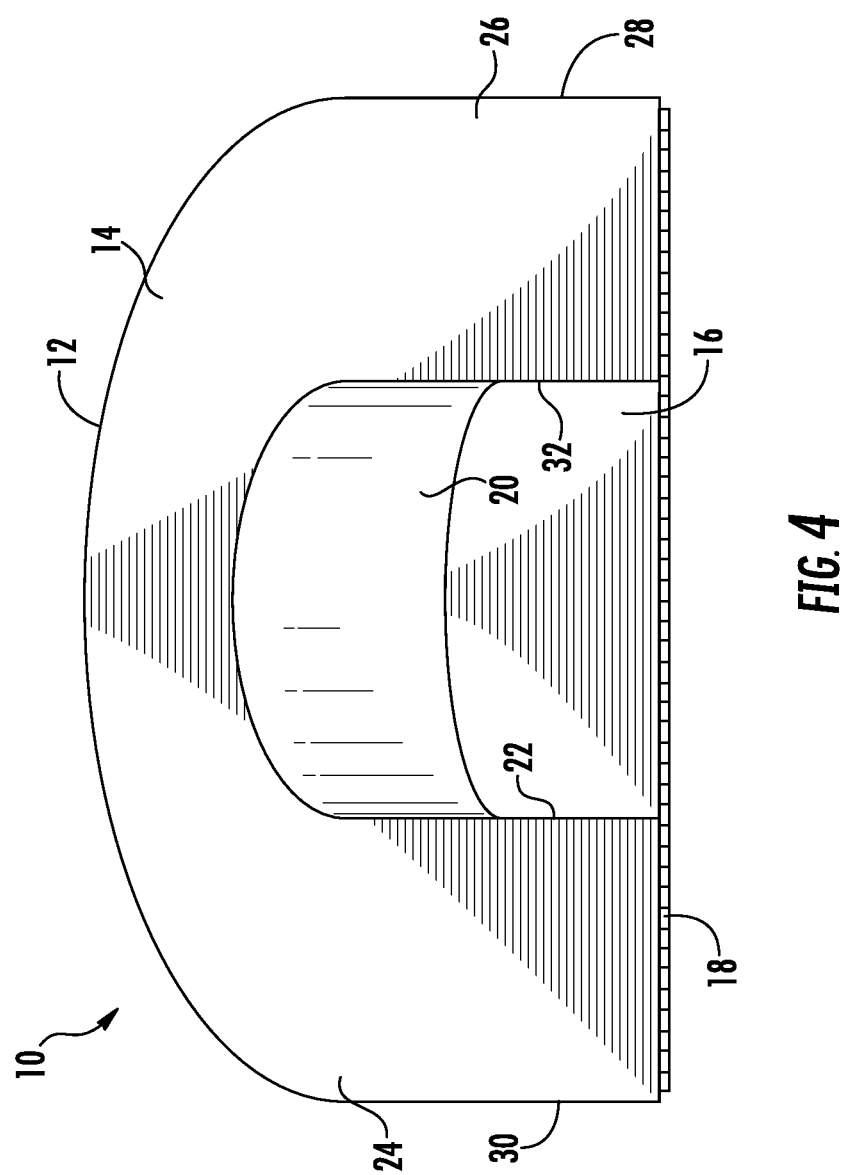

ously sloped second top surface is at a lesser angle
CHAIR WEDGE

FIELD OF THE INVENTION

The technology described herein relates generally to devices, systems, and methods for storing and maintaining chairs of the type that are typically folded and stacked. More specifically, this technology relates to a device, system, and associated methods for a two-tiered, wedge-shaped chair wedge stopper with which to maintain stacked folding chairs and to prevent the chairs from falling.

BACKGROUND OF THE INVENTION

Chairs that are foldable and stackable are known in the background art. Maintaining such foldable and stackable chairs in a safe, secure position has proven a challenge over time. Devices, systems, and methods such as chair stackers, stacking devices, chair racks, chair trucks, chair carts, and so forth, are known in the background art. However, there are many substantial deficiencies and shortcomings with these known devices and systems.

Related utility patents known in the art include the following:

U.S. Pat. No. 5,967,605, issued to Stanfield on Oct. 19, 1999, discloses a folding chair with stacking device.

U.S. Pat. No. 6,866,338, issued to Mendenhall et al. on Mar. 15, 2005, discloses a chair stacker apparatus.

Related non-patent literature known in the art include the following:

A door stop, as found online at http://www.liapela.com/Door-Stop.html on Mar. 8, 2016.

A chair cart found online at http://www.staples.com/NPS-Under-Stage-Converter-Kit-For-DY-35-DY-Folding-Chair/product_310862 on Mar. 8, 2016.

According to the present disclosure, a chair wedge includes a two-tiered wedge-shaped chair wedge stopper with which to maintain stacked folding chairs and to prevent the chairs from falling.

In an illustrative embodiment, the chair wedge includes a first tier horseshoe-shaped wedge and a second, lower tier, between which a cavity is formed configured to receive the leg of a stackable folding chair.

Additional features of the disclosure will become apparent to those skilled in the art upon consideration of the following detailed description of illustrative embodiments exemplifying the best mode of carrying out the disclosure as presently perceived.

The foregoing patent and other information reflect the state of the art of which the inventor is aware and are tendered with a view toward discharging the inventor's acknowledged duty of candor in disclosing information that may be pertinent to the patentability of the technology described herein. It is respectfully stipulated, however, that the foregoing patent and other information do not teach or render obvious, singly or when considered in combination, the inventor's claimed invention.

BRIEF SUMMARY OF THE INVENTION

In various exemplary embodiments, the technology described herein provides a device, system, and method for a chair wedge having a first tier horseshoe-shaped wedge and a second, lower tier, between which a cavity is formed configured to receive the leg of a stackable folding chair.

In one exemplary embodiment, the technology described herein provides a chair wedge. The chair wedge includes: a first tier having a downward sloped first top surface from a first tier top rear edge to a first tier top front edge; a second tier recessed within a center portion of the first tier and having a downward sloped second top surface from a second tier top rear edge to a second tier top front edge, and wherein the downward sloped second top surface is at a lesser angle relative to a base surface than is the downward sloped first top surface; a cavity formed in a space differential between the downward sloped first top surface and the downward sloped second top surface; and a rear wall defined at an inward most portion of the cavity and configured in combination with the cavity to stop a chair leg from further movement when placed within the chair wedge.

In at least one embodiment, the chair wedge includes generally a horseshoe shape downwardly sloped from a toe area to a heel area, the first tier of the chair wedge comprises generally a horseshoe downwardly sloped to the heel area, and the second tier of the chair wedge is recessed within the horseshoe-shaped first tier.

In at least one embodiment, the chair wedge also includes a base of the chair wedge having a non-slip bottom surface such that it remains in place even with the weight of one or more stackable, foldable chairs placed within the chair wedge.

In at least one embodiment of the chair wedge, the base is rubber.

In at least one embodiment of the chair wedge, the base is plastic.

In at least one embodiment of the chair wedge, the base is integrally formed with the chair wedge.

In at least one embodiment of the chair wedge, the entire chair wedge is integrally formed and is plastic.

In at least one embodiment of the chair wedge, the entire chair wedge is integrally formed and is rubber.

In at least one embodiment, chair wedge also includes: a base of the chair wedge, wherein the base is generally hollow; and at least one structural ridge member disposed on an underside surface of the chair wedge to provide support to the chair wedge from a base surface upon which the chair wedge rests.

In at least one embodiment, chair wedge further includes a tether coupled to the chair wedge and configured for coupling to a second chair wedge such that a pair of chair wedges is readily available to use as a stop for a stack of stackable folding chairs, one on each side of the chair legs.

In at least one embodiment, chair wedge also includes an outer rear edge, wherein the outer rear edge comprises a downward sloped third surface that slope in a direction opposite that of both the downward sloped first top surface and the downward sloped second top surface.

In another exemplary embodiment, the technology described herein provides a pair of chair wedges. Each of the first chair wedge and second chair wedge of the pair includes: a first tier having a downward sloped first top surface from a first tier top rear edge to a first tier top front edge; a second tier recessed within a center portion of the first tier and having a downward sloped second top surface from a second tier top rear edge to a second tier top front edge, and wherein the downward sloped second top surface is at a lesser angle relative to a base surface than is the downward sloped first top surface; a cavity formed in a space differential between the downward sloped first top surface and the downward sloped second top surface; and a rear wall defined at an inward most portion of the cavity and configured in combination with the cavity to stop a chair leg from further movement when placed within the chair wedge. The pair of chair wedges further comprising a tether coupled each of the first chair wedge and the second chair wedge such that the pair of chair wedges is readily available to use as a stop for a stack of stackable folding chairs, one on each side of the chair legs.

In at least one embodiment, each of the chair wedges comprises generally a horseshoe shape downwardly sloped from a toe area to a heel area, the first tier of the chair wedge comprises generally a horseshoe shape downwardly sloped to the heel area, and the second tier of the chair wedge is recessed within the horseshoe-shaped first tier.

In at least one embodiment, each chair wedge having a base having a non-slip bottom surface such that it remains in place even with the weight of one or more stackable, foldable chairs placed within the chair wedge.

In at least one embodiment, each base is rubber.

In at least one embodiment, each base is plastic.

In at least one embodiment, the entirety of each chair wedge is integrally formed and is plastic.

In at least one embodiment, the entirety of each chair wedge is integrally formed and is rubber.

In yet another exemplary embodiment, the technology described herein provides a method for storing and maintaining chairs of the type that are typically folded and stacked. The method includes: utilizing a chair wedge having: a first tier having a downward sloped first top surface from a first tier top rear edge to a first tier top front edge; a second tier recessed within a center portion of the first tier and having a downward sloped second top surface from a second tier top rear edge to a second tier top front edge, and wherein the downward sloped second top surface is at a lesser angle relative to a base surface than is the downward sloped first top surface; a cavity formed in a space differential between the downward sloped first top surface and the downward sloped second top surface; and a rear wall defined at an inward most portion of the cavity and configured in combination with the cavity to stop a chair leg from further movement when placed within the chair wedge; and placing a chair wedge under a chair leg in a stacked formation, such that the chair wedge aids in the prevention of chair falls.

In at least one embodiment, the method also includes: utilizing a pair of chair wedges that are tethered one to another; placing a first chair wedge under a first chair leg in a stacked formation, such that the chair wedge aids in the prevention of chair falls; and placing a second chair wedge under a second chair leg in a stacked formation, such that the chair wedge aids in the prevention of chair falls.

Thus, advantageously, the device, system, and methods disclosed herein provide a two-tiered, wedge-shaped chair wedge stopper with which to maintain stacked folding chairs and to prevent the chairs from falling.

There has thus been outlined, rather broadly, the more important features of the technology in order that the detailed description thereof that follows may be better understood, and in order that the present contribution to the art may be better appreciated. There are additional features of the technology that will be described hereinafter and which will form the subject matter of the claims appended hereto. In this respect, before explaining at least one embodiment of the technology in detail, it is to be understood that the invention is not limited in its application to the details of construction and to the arrangements of the components set forth in the following description or illustrated in the drawings. The technology described herein is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the technology described herein.

Further objects and advantages of the technology described herein will be apparent from the following detailed description of a presently preferred embodiment which is illustrated schematically in the accompanying drawings.

BRIEF DESCRIPTION OF THE DRAWINGS

The technology described herein is illustrated with reference to the various drawings, in which like reference numbers denote like device components and/or method steps, respectively, and in which:

FIG. 4 is a front planar view of the chair wedge, illustrating, in particular, a first tier horseshoe-shaped wedge and a second, lower tier, between which a cavity is formed configured to receive the leg of a stackable folding chair, according to an embodiment of the technology described herein;

DETAILED DESCRIPTION OF THE INVENTION

Before describing the disclosed embodiments of this technology in detail, it is to be understood that the technology is not limited in its application to the details of the particular arrangement shown here since the technology described is capable of other embodiments. Also, the terminology used herein is for the purpose of description and not of limitation.

In various exemplary embodiments, the technology described herein provides a device, system, and method for a chair wedge. The chair wedge generally includes a first tier horseshoe-shaped wedge and a second, lower tier, recessed within the first tier and within which a cavity is defined and therefore configured to receive the leg or foot portion of a stackable folding chair when it is in a folded position and therefore to aid in the prevention of falling stacked chairs when multiple such chairs are folded and stacked adjacent to one another.

Figure 10:
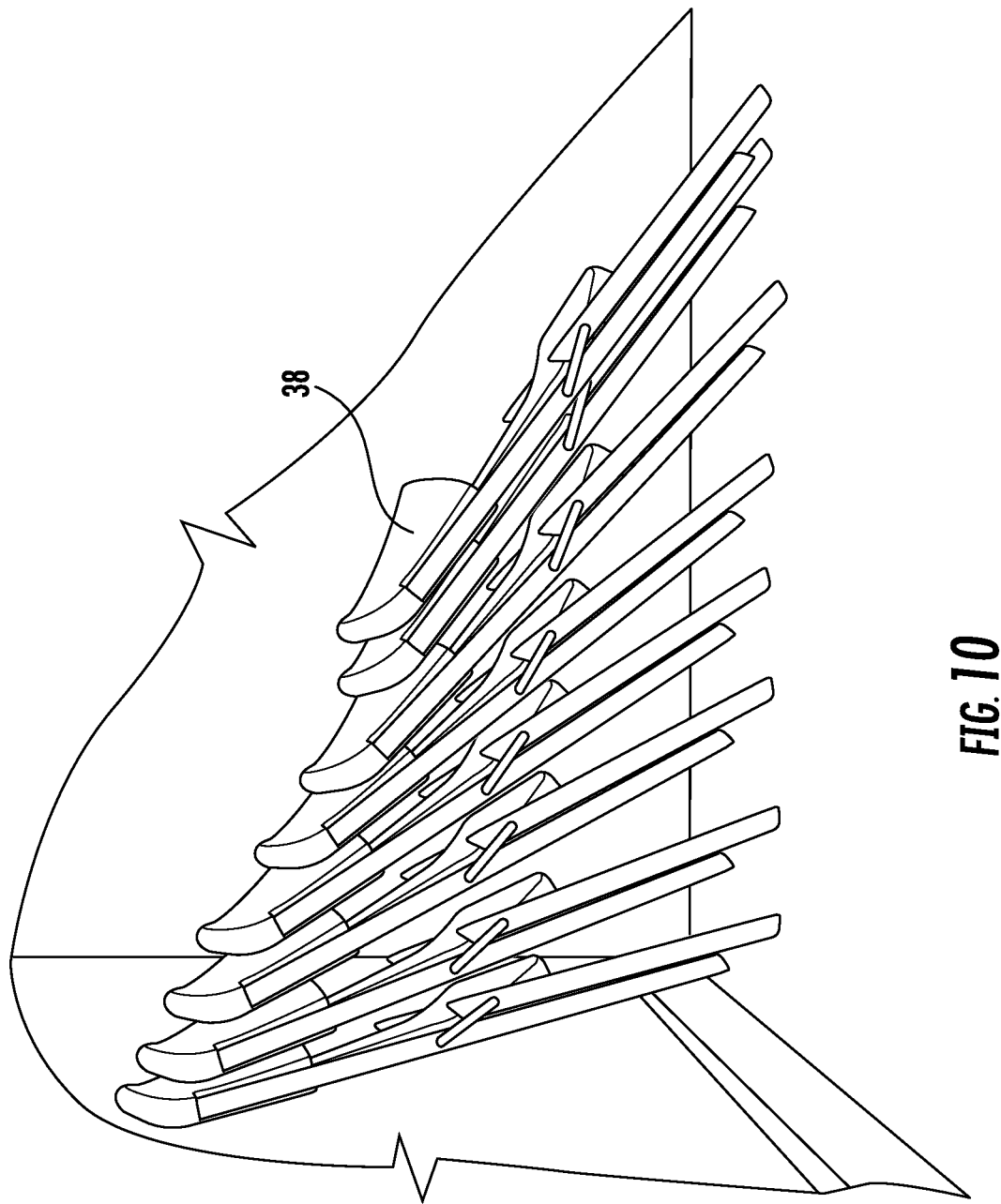
FIG. 10 is a view of stackable folding chairs known in the art, illustrating, in particular, the propensity for stackable folding chairs to fall over and/or slide away from formation.
Figure 11:
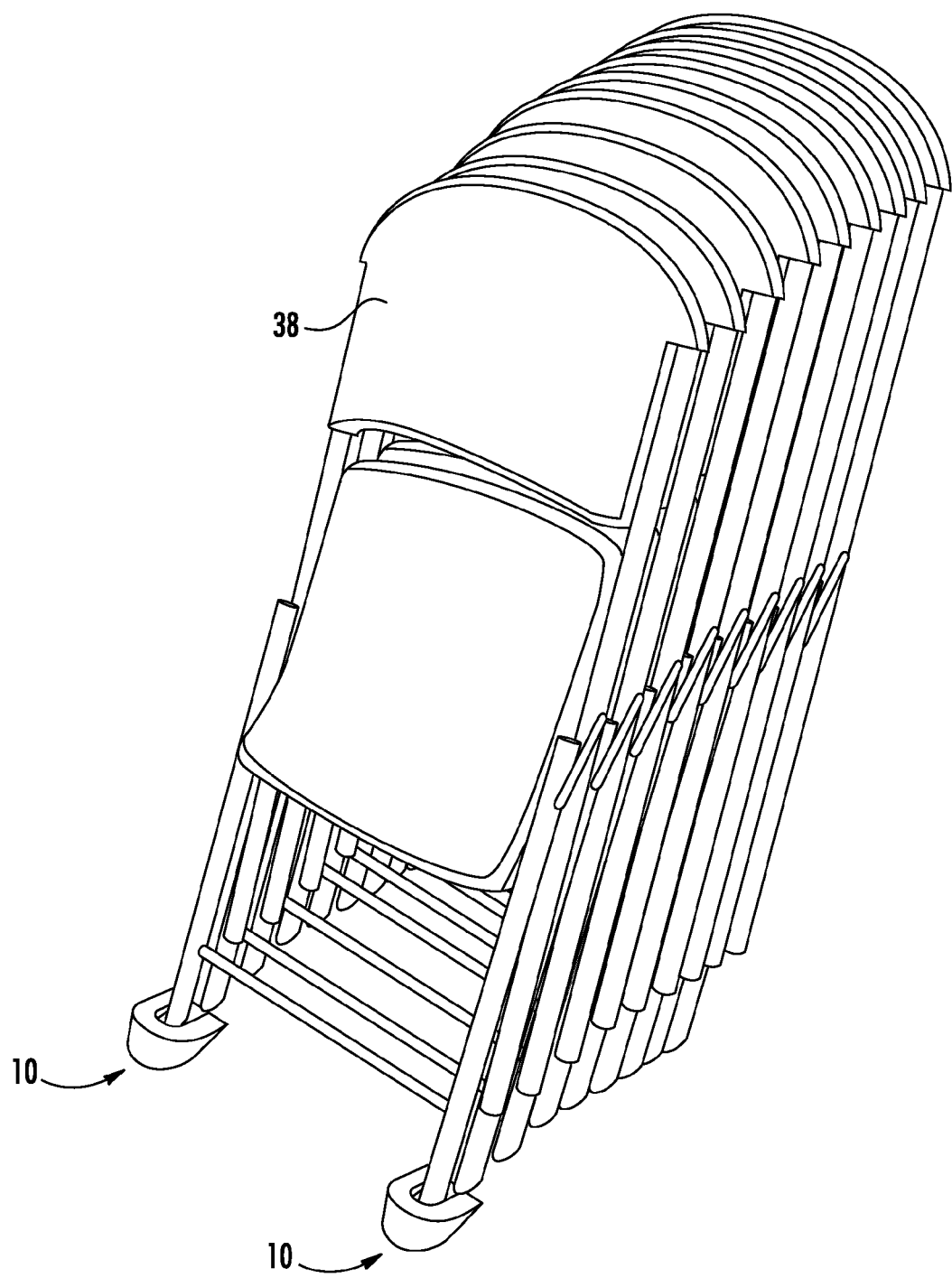
FIG. 11 is a perspective view of two chair wedges shown in use securing and stabilizing multiple stackable folding chairs and aiding in fall prevention, according to an embodiment of the technology described herein.

Referring now to the Figures, a chair wedge 10 is shown. The chair wedge 10 is configured to maintain stacked folding chairs 38 and to prevent the chairs 38 from falling. Because stacks of folding chairs 38 tend to fall over and cause disruptions, including minor injuries and distractions, utilization of one or more chair wedges 10 aids in the prevention of chair falls. By way of example, and as depicted in FIG. 10, chairs 38 are shown sliding from what was once a stacked position with all chairs propped up against a wall surface. Also, by way of example, and as depicted in FIG. 11, chairs 38 are shown secured by a pair of chair wedges 10. This application of the chair wedges 10 keeps chairs 38 in a safe, upright position and aids in the prevention of falling stacked chairs.

The chair wedge 10 includes a first tier 14. The first tier 14 has a downward sloped first top surface. The downward sloped first top surface extends from a first tier top rear edge, where first tier 14 meets outer rear edge 12, to a first tier top front edge, where right side ramp 26 and left side ramp approach the base 18.

The chair wedge 10 includes a second tier 16. The second tier 16 is recessed within a center portion of the first tier 14. The second tier 16 also has a downward sloped second top surface. The downward sloped second top surface extends from a second tier top rear edge where first tier inner rear wall 20 meets second tier 16, to a second tier top front edge where second tier 16 nears base 18. First tier inner sidewall 22, first tier right outside wall 28, and first tier left outside wall 30 all are tapered in height as they each approach the base 18. The downward sloped second top surface is at a lesser angle relative to a base surface than is the downward sloped first top surface. This novel two-tiered arrangement provides for an interior recessed area in which to receive a chair leg.

The chair wedge 10 includes a cavity. The cavity is formed in a space differential between the downward sloped first top surface of first tier 14 and the downward sloped second top surface of second tier 16, wherein the second tier 16 is recessed within a center portion of the first tier 14. The cavity provides a receiving area for the foot of a chair or a chair leg.

The chair wedge 10 includes first tier inner rear wall 20. The first tier inner rear wall 20 is defined at an inward most portion of the cavity. The chair wedge 10 includes first tier inner right side wall 32 and first tier inner left side wall 22, each extending from the first tier inner rear wall 20. Each of the first tier inner rear wall 20, first tier inner right side wall 32, and first tier inner left side wall 22 extends vertically, downwardly from first tier 14 to second tier 16. The first tier inner rear wall 20 in combination with the cavity is configured to stop a chair leg from further movement when placed within the chair wedge 10.

Figure 2:
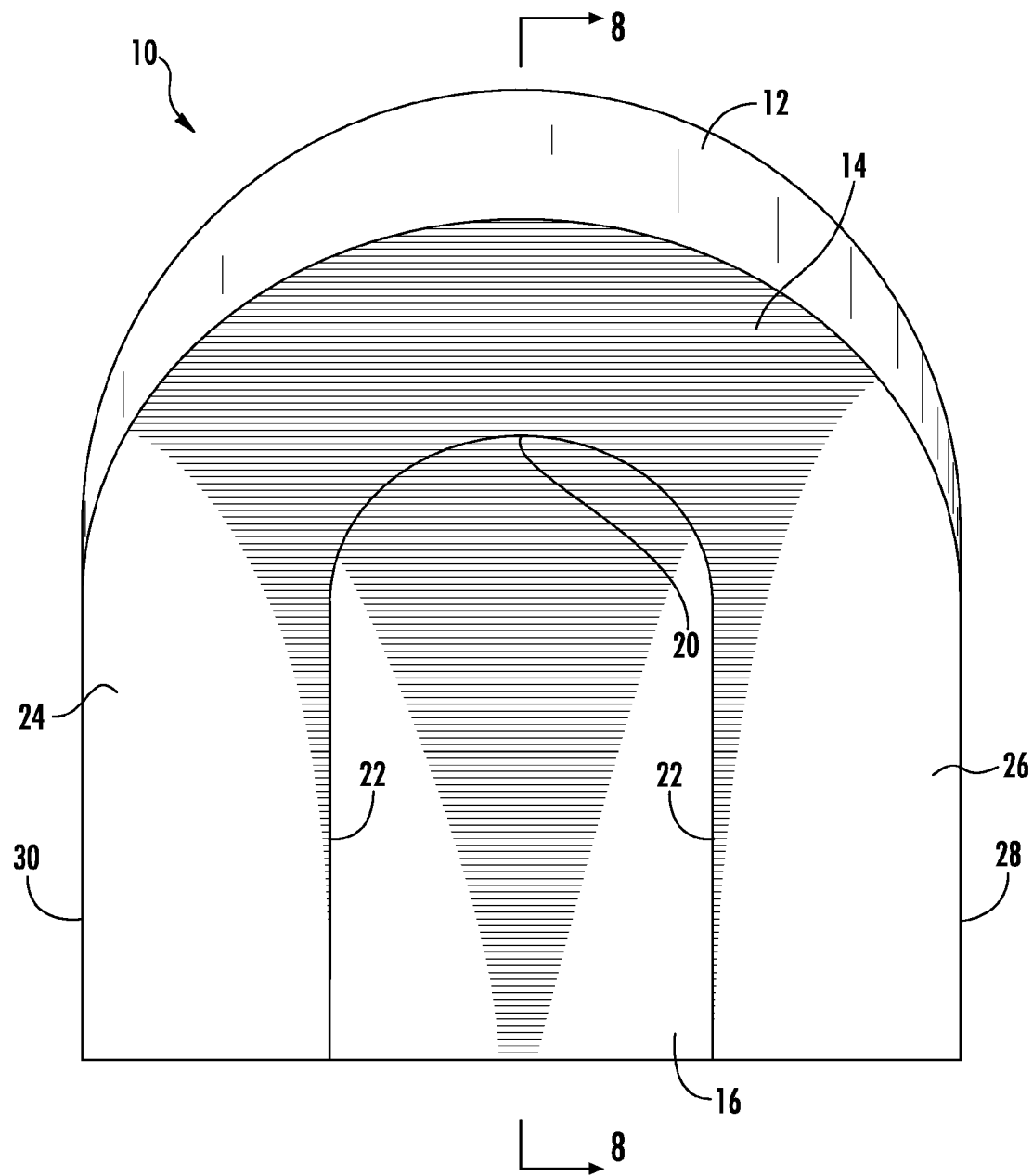
FIG. 2 is a top planar view of the chair wedge, illustrating, in particular, a first tier horseshoe-shaped wedge and a second tier on which to receive the leg or foot of a stackable folding chair, according to an embodiment of the technology described herein.
Figure 8:
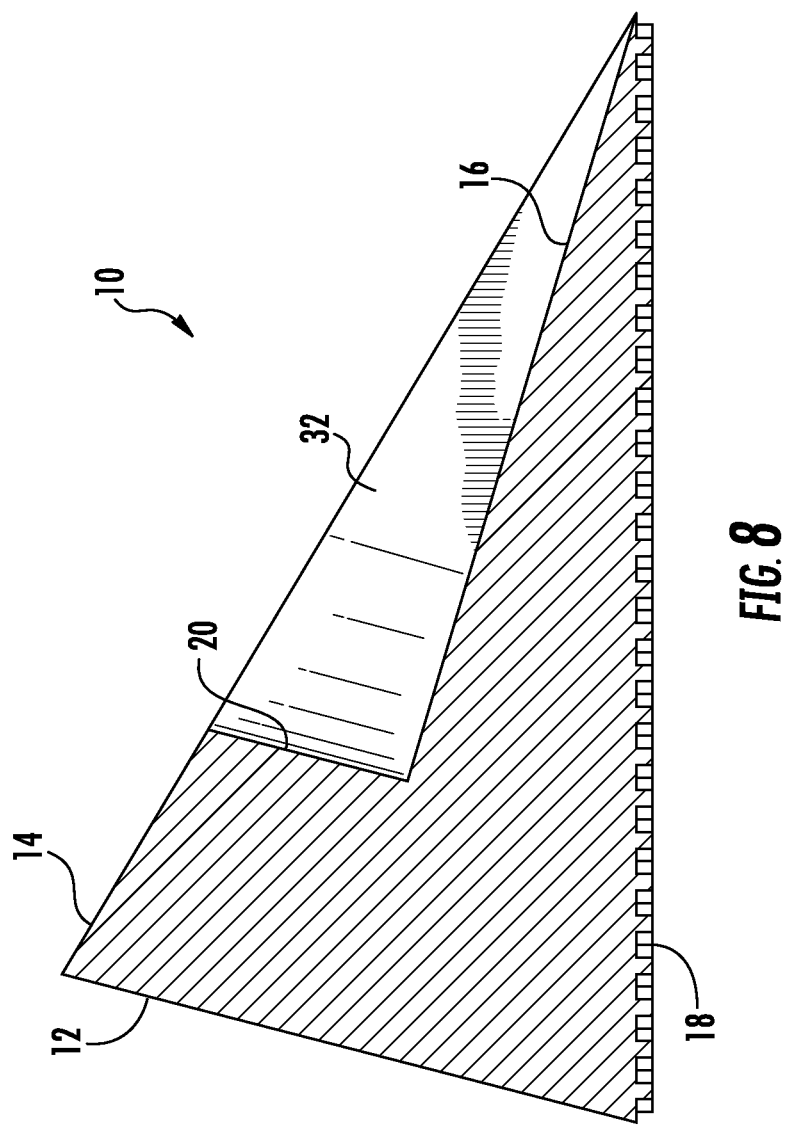
FIG. 8 is a side cross-sectional view of the chair wedge, along line 8-8 in FIG. 2, illustrating, in particular, a first tier horseshoe-shaped wedge and a second, lower tier, between which a cavity is formed configured to receive the leg of a stackable folding chair, according to an embodiment of the technology described herein.

The cavity and first tier inner walls are best depicted in FIGS. 4 and 8. FIG. 4 is a front planar view of the chair wedge 10. FIG. 8 is a side cross-sectional view of the chair wedge, along line 8-8 in FIG. 2. Both figures illustrate the cavity formed in a space differential between the downward sloped first top surface of first tier 14 and the downward sloped second top surface of second tier 16. This cavity is formed configured to receive the leg of a stackable folding chair.

Figure 1:
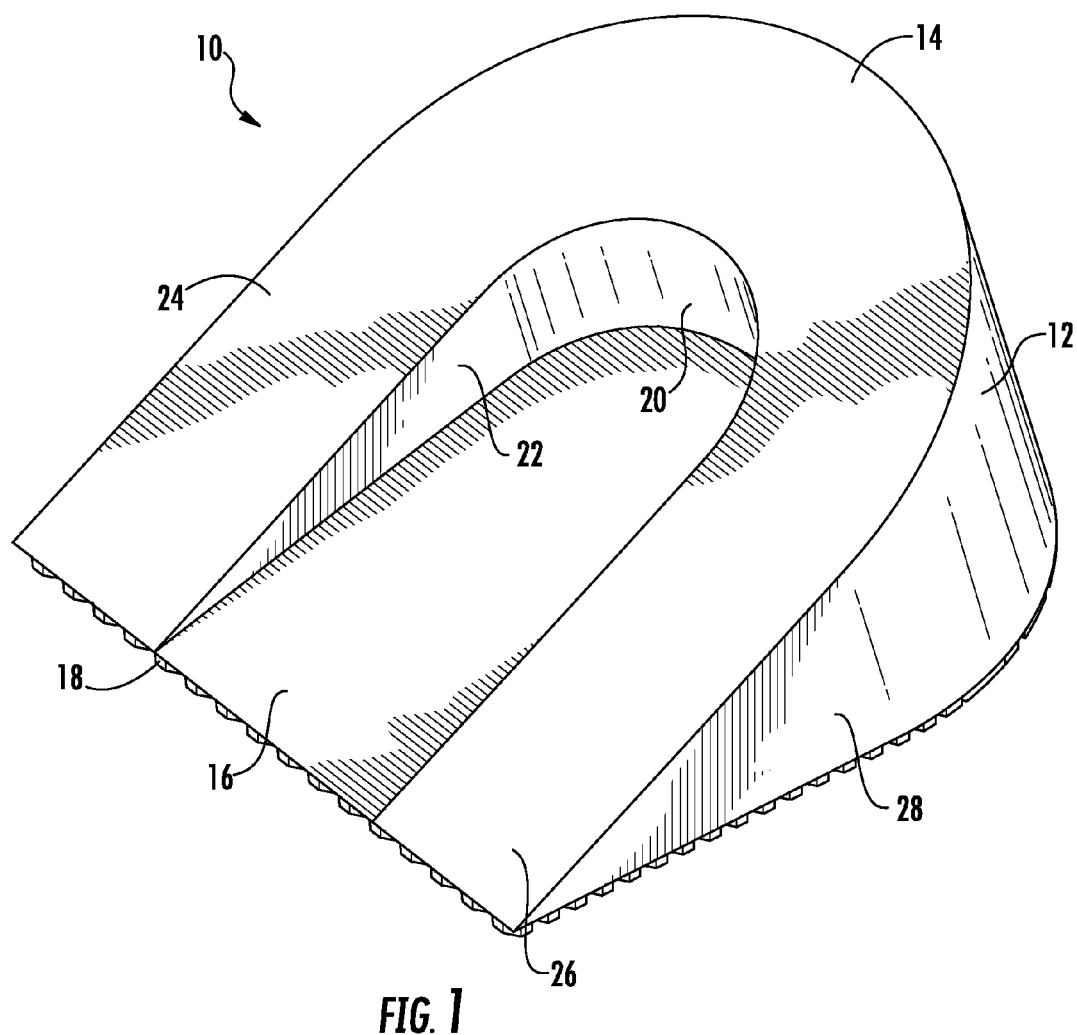
FIG. 1 is a front perspective view of a chair wedge, illustrating, in particular, the two-tiered, horseshoe-shaped wedge, in which a cavity is formed configured to receive the leg of a stackable folding chair according to an embodiment of the technology described herein.

In at least one embodiment, the chair wedge 10 is generally a horseshoe shape. This horseshoe-shaped chair wedge 10, as depicted for example in FIG. 1, is downwardly sloped from a toe area, intersection of outer rear edge 12 and first tier 14 (the "toe" area of a traditional horseshoe) to a heel area, the portion of the chair wedge 10 closest to the base surface (the "heel" area of a traditional horseshoe). In this embodiment, the first tier 14 of the chair wedge 10 is generally a horseshoe shape downwardly sloped along right side ramp 26 and left side ramp 24 to the heel area. In this embodiment, the second tier 16 of the chair wedge 10 is recessed within the horseshoe-shaped first tier 14.

The chair wedge 10 includes a base 18. In at least one embodiment, the base 18 of the chair wedge 10 includes a non-slip bottom surface such that it remains in place even with the weight of one or more stackable, foldable chairs 38 placed within the chair wedge 10, as depicted in FIG. 11, for example.

Figure 3A:
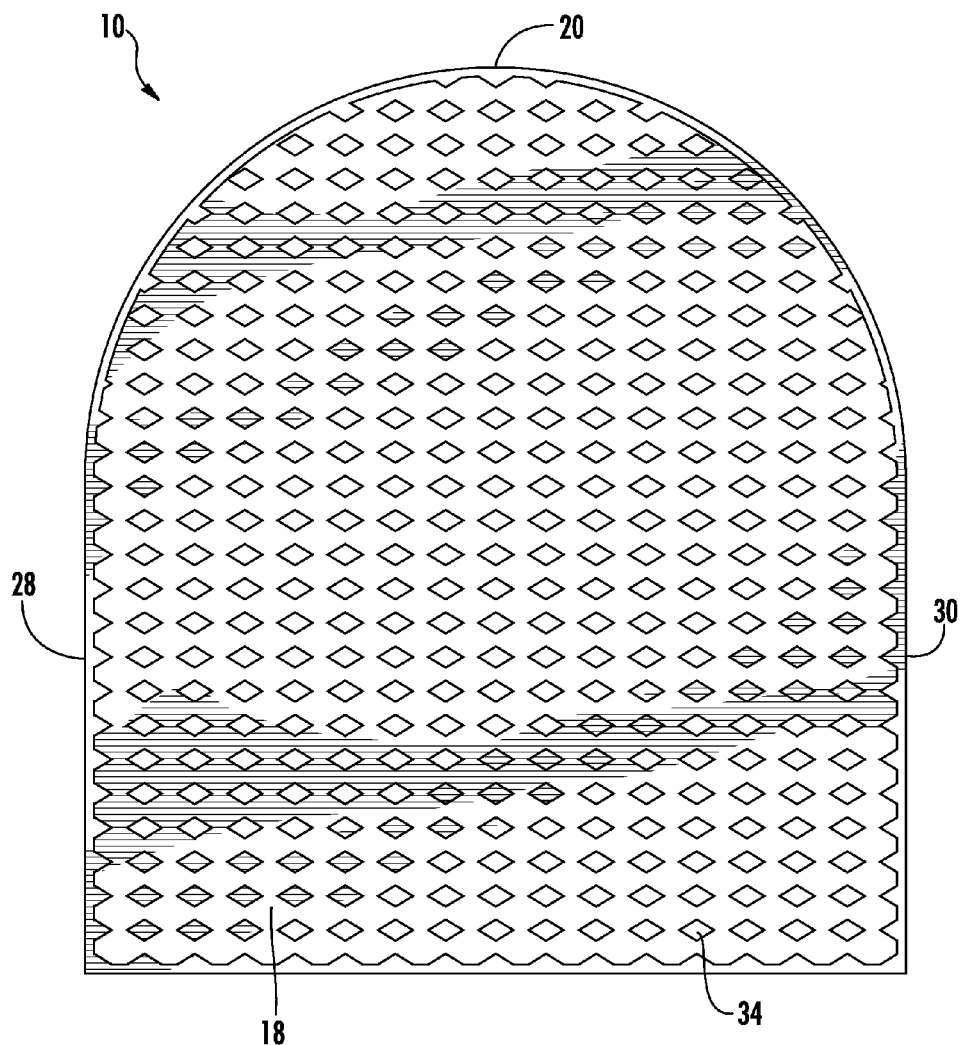
FIG. 3A is a bottom planar view of the chair wedge, illustrating, in particular, a slide-resistant surface, according to an embodiment of the technology described herein.

As depicted for example in FIG. 3A, a non-slip bottom surface is shown. In at least one embodiment, the non-slip bottom surface further includes a textured pattern 34 to provide further resistance to sliding for the chair wedge 10. The textured pattern 34 covers the entire base 18 in at least one embodiment. In alternative embodiments, the textured patter 34 covers predetermined portions of the base 18.

In at least one embodiment of the chair wedge 10, the base 18 is rubber. In at least one embodiment of the chair wedge 10, the base 18 is plastic.

In at least one embodiment of the chair wedge 10, the base 18 is integrally formed with the chair wedge 10. In at least one embodiment of the chair wedge 10, the entire chair wedge 10 is integrally formed and is plastic.

In at least one alternative embodiment, the base 18 is generally hollow. The generally hollow base 18 includes, for example, cavity area 48. In this embodiment, the base 18 also includes at least one structural ridge member to provide support to the first tier 14 and the second tier 16. The structural ridge member, such as first horizontal bar 44, second horizontal bar 42, and horseshoe-shaped bar 40, is disposed on underside surface of the chair wedge 10 to provide support to the chair wedge 10 from a base surface upon which the chair wedge 10 rests.

Figure 3B:
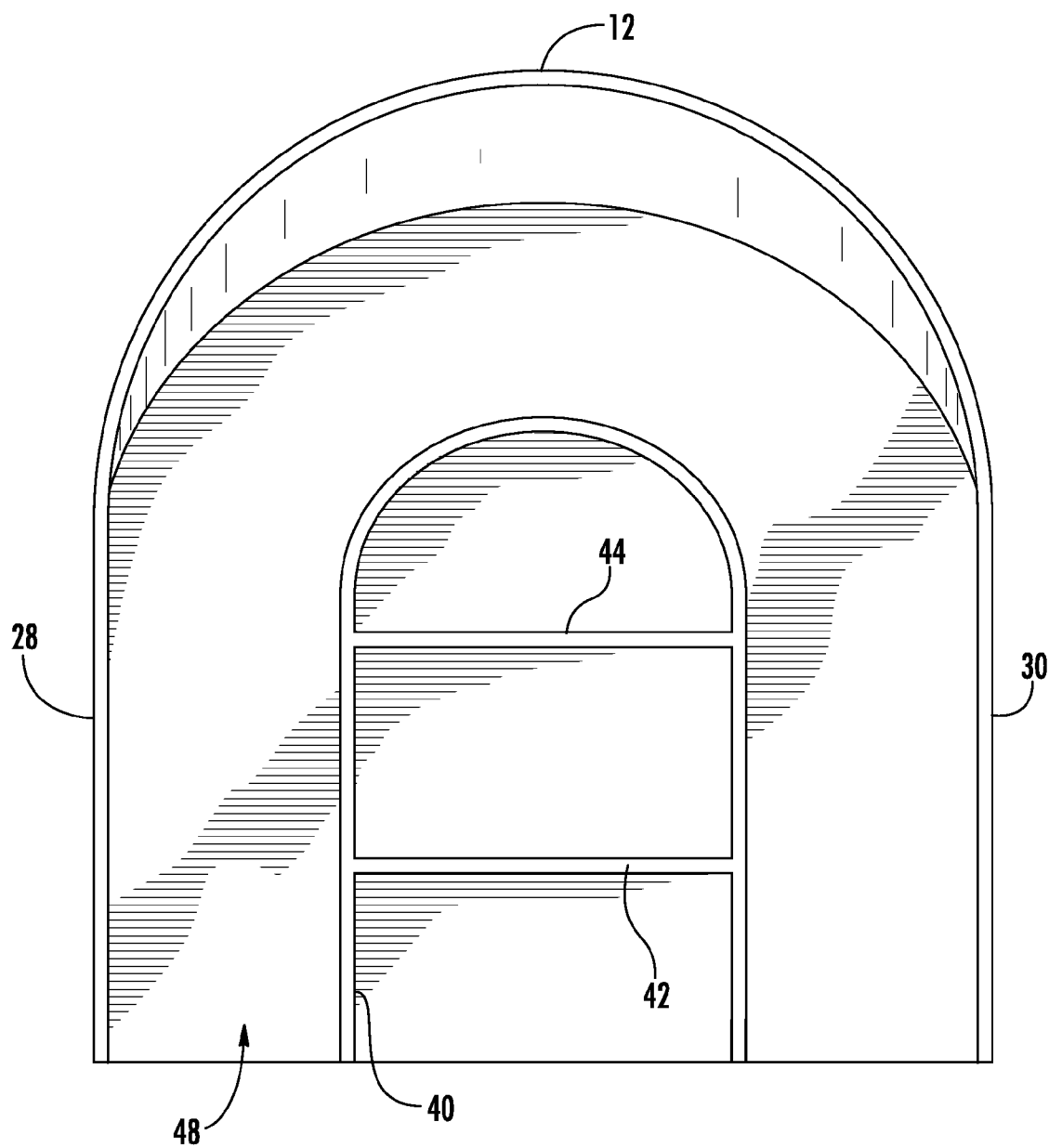
FIG. 3B is a bottom planar view of the chair wedge, illustrating, in particular, an alternative base in which the base in generally hollow and includes support walls, according to an alternative embodiment of the technology described herein.
Figure 5:
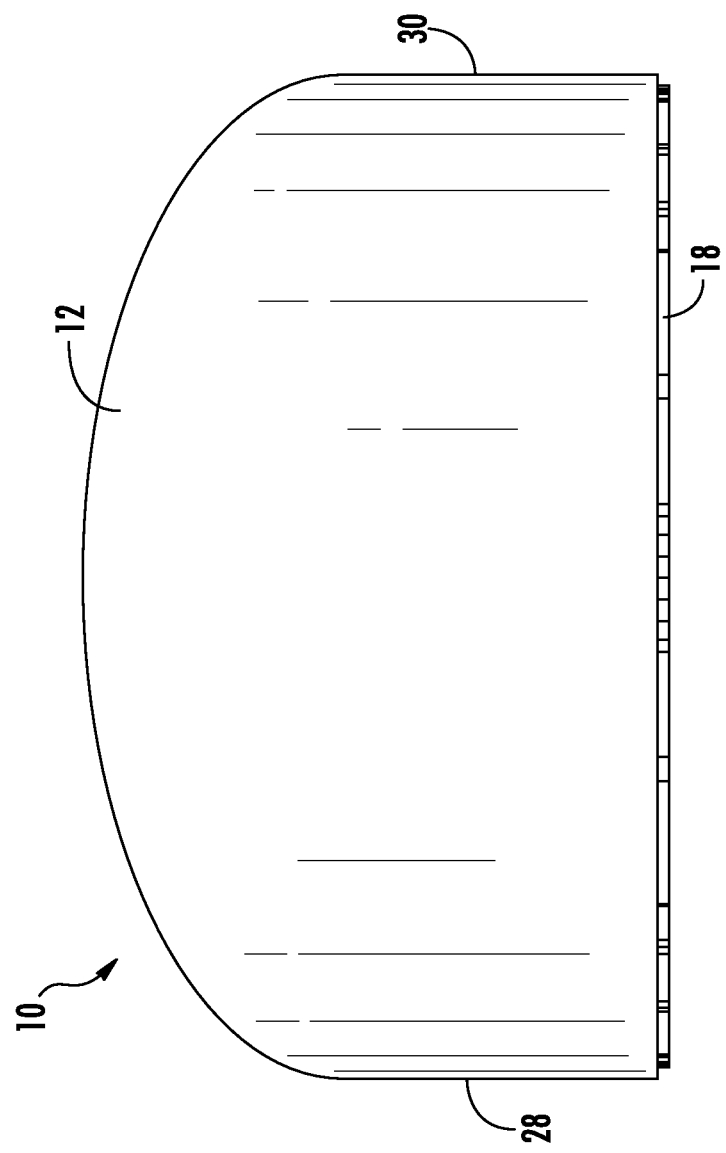
FIG. 5 is a rear planar view of the chair wedge, according to an embodiment of the technology described herein.
Figure 6:
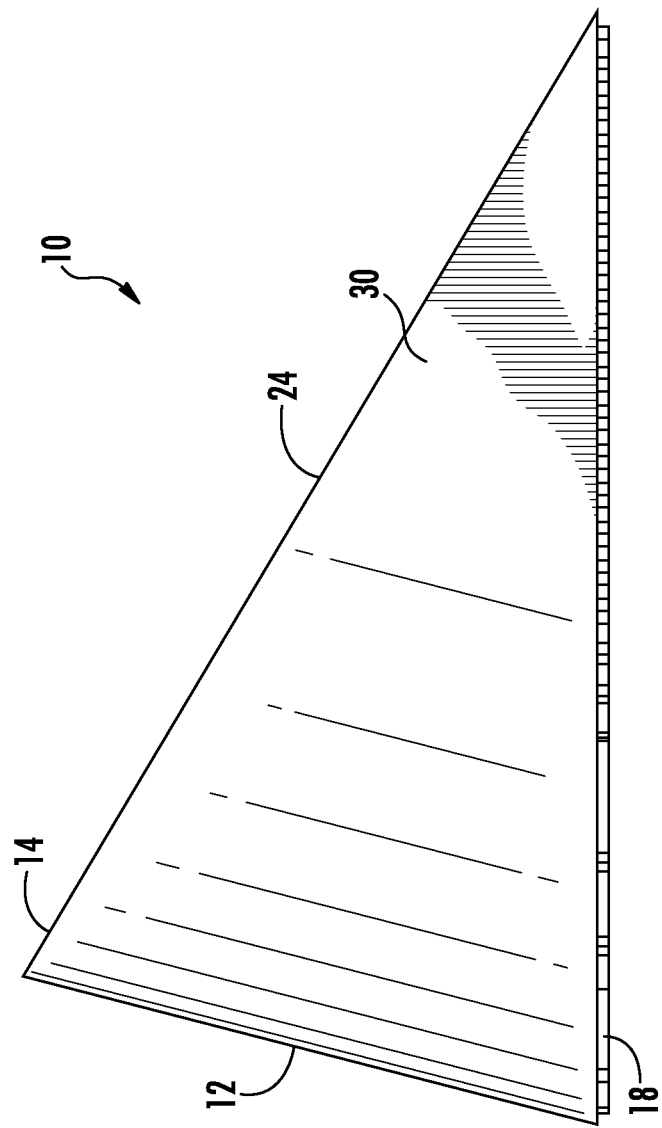
FIG. 6 is a left side planar view of the chair wedge, illustrating, in particular, an optimal slope to the first tier horseshoe-shaped wedge for chair support, according to an embodiment of the technology described herein.
Figure 7:
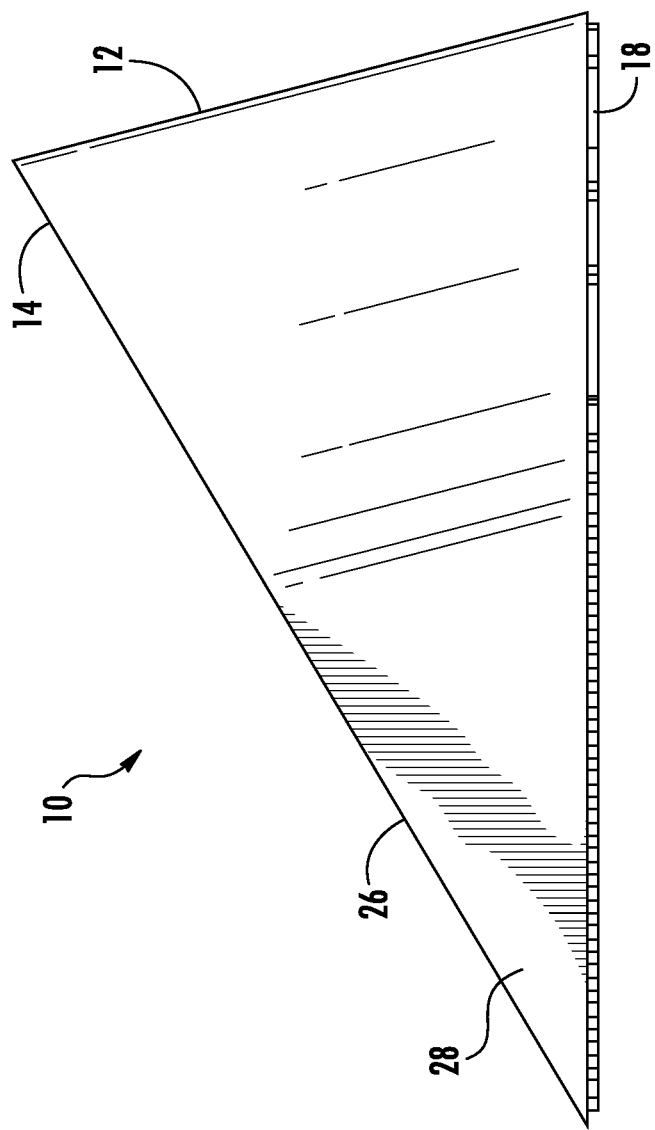
FIG. 7 is a right side planar view of the chair wedge, illustrating, in particular, an optimal slope to the first tier horseshoe-shaped wedge for chair support, according to an embodiment of the technology described herein.

As depicted for example in FIG. 3B, the base 18 is generally hollow. The structural ridge members: first horizontal bar 44, second horizontal bar 42, and horseshoe-shaped bar 40, each provide structural support to the chair wedge 10. The areas between the structural ridge members are hollow.

The chair wedge 10 also includes an outer rear edge 12. The outer rear edge 12 includes a downward sloped third surface that slopes in a direction that is opposite that of both the downward sloped first top surface and the downward sloped second top surface. This provides increased structural stability to the chair wedge 10 when downward forces from multiple folded stackable chairs 38 are applied to the chair wedge 10.

Figure 9:
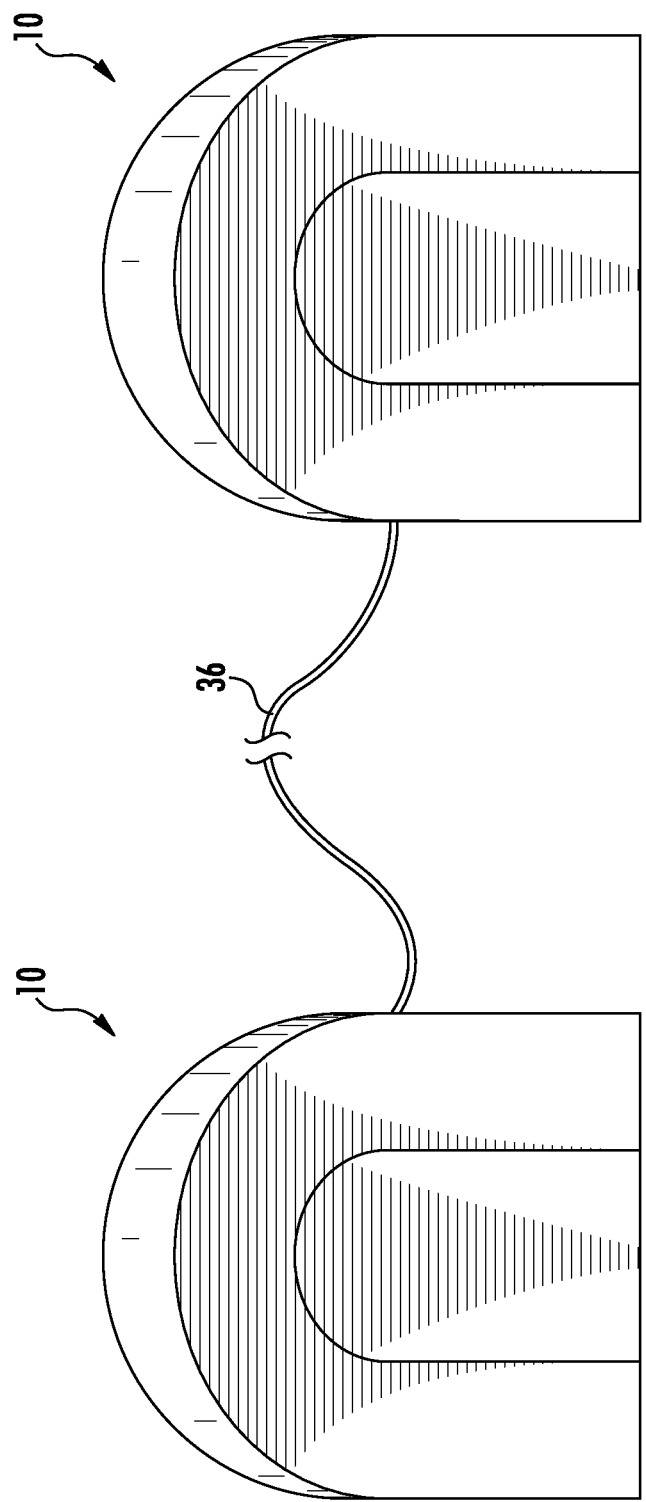
FIG. 9 is a view of a pair of chair wedges shown in use tethered, illustrating, in particular, a means by which a pair of chair wedges is easily used, carried, and also stored together for future use, according to an embodiment of the technology described herein.

In at least one embodiment, the chair wedge 10 includes a tether 36. In various embodiments, the tether 36 is selected from cord, wire, or leather. The tether 36 is securely fastened to the chair wedge at a point on the chair wedge 10 that will not interrupt the general operation of the chair wedge 10. The tether 36 is coupled to the chair wedge 10. The tether 36 is configured for coupling to a second chair wedge 10 such that a pair of chair wedges is readily available to use as a stop for a stack of stackable folding chairs, one on each side of the chair legs. As depicted specifically in FIG. 9, a pair of chair wedges in tether together via tether 36.

Although this technology has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the technology disclosed herein and are intended to be covered by the following claims.

What is claimed is:
1. A chair wedge comprising:
   a base of the chair wedge;
   a first tier comprising a generally horseshoe shape and having a downward sloped planar first top surface extending from a first tier top rear edge to a first tier top front edge;
   a second tier recessed within a center portion of the first tier and having a downward sloped second top surface from a second tier top rear edge to a second tier top front edge, and wherein the downward sloped second top surface is at a lesser angle relative to a base surface than is the downward sloped first top surface, and wherein the first tier top front edge and the second tier top front edge both end on a common axis immediately above the base;
   a cavity formed in a space differential between the downward sloped first top surface and the downward sloped second top surface; and a curved rear wall defined at an inward most portion of the cavity and configured in combination with the cavity to stop a chair leg from further movement when placed within the chair wedge, wherein the curved rear wall is at a generally right angle relative to the second tier;
   a first tier inner left sidewall and a first tier inner right sidewall which both extend from the curved rear wall to the common axis and taper in height as they approach the common axis.

2. The chair wedge of claim 1, further comprising:
   a base of the chair wedge having a non-slip bottom surface such that it remains in place even with the weight of one or more stackable, foldable chairs placed within the chair wedge.
3. The chair wedge of claim 2, wherein the base is rubber.
4. The chair wedge of claim 2, wherein the base is plastic.
5. The chair wedge of claim 2, wherein the base is integrally formed with the chair wedge.
6. The chair wedge of claim 1, wherein the entire chair wedge is integrally formed and is plastic.
7. The chair wedge of claim 1, wherein the entire chair wedge is integrally formed and is rubber.
8. The chair wedge of claim 1, further comprising:
   wherein the base is generally hollow; and
   at least one structural ridge member disposed on an underside surface of the chair wedge to provide support to the chair wedge from a base surface upon which the chair wedge rests.
9. The chair wedge of claim 1, further comprising:
   a tether coupled to the chair wedge and configured for coupling to a second chair wedge such that a pair of chair wedges is readily available to use as a stop for a stack of stackable folding chairs, one on each side of the chair legs.
10. The chair wedge of claim 1, further comprising:
    an outer rear edge, wherein the outer rear edge comprises a downward sloped third surface that slope in a direction opposite that of both the downward sloped first top surface and the downward sloped second top surface.
11. A pair of chair wedges, each of the first chair wedge and second chair wedges comprising:
    a base of the chair wedge;
    a first tier comprising a generally horseshoe shape and having a downward sloped planar first top surface extending from a first tier top rear edge to a first tier top front edge;
    a second tier recessed within a center portion of the first tier and having a downward sloped second top surface from a second tier top rear edge to a second tier top front edge, and wherein the downward sloped second top surface is at a lesser angle relative to a base surface than is the downward sloped first top surface, and wherein the first tier top front edge and the second tier top front edge both end on a common axis immediately above the base;
    a cavity formed in a space differential between the downward sloped first top surface and the downward sloped second top surface; and a curved rear wall defined at an inward most portion of the cavity and configured in combination with the cavity to stop a chair leg from further movement when placed within the chair wedge, wherein the curved rear wall is at a generally right angle relative to the second tier;
    a first tier inner left sidewall and a first tier inner right sidewall which both extend from the curved rear wall to the common axis and taper in height as they approach the common axis;
    the pair of chair wedges further comprising a tether coupled each of the first chair wedge and the second chair wedge such that the pair of chair wedges is readily available to use as a stop for a stack of stackable folding chairs, one on each side of the chair legs.
12. The pair of chair wedges of claim 11, further comprising:

each chair wedge having a base having a non-slip bottom surface such that it remains in place even with the weight of one or more stackable, foldable chairs placed within the chair wedge.

13. The pair of chair wedges of claim 12, wherein each base is rubber.

14. The pair of chair wedges of claim 12, wherein each base is plastic.

15. The pair of chair wedges of claim 11, wherein the entirety of each chair wedge is integrally formed and is plastic.

16. The chair wedge of claim 1, wherein the entirety of each chair wedge is integrally formed and is rubber.

17. A method for storing and maintaining chairs of the type that are typically folded and stacked, the method comprising:
   utilizing a chair wedge comprising:
      a base of the chair wedge;
      a first tier comprising a generally horseshoe shape and having a downward sloped planar first top surface extending from a first tier top rear edge to a first tier top front edge;
      a second tier recessed within a center portion of the first tier and having a downward sloped second top surface from a second tier top rear edge to a second tier top front edge, and wherein the downward sloped second top surface is at a lesser angle relative to a base surface than is the downward sloped first top surface, and wherein the first tier top front edge and the second tier top front edge both end on a common axis immediately above the base;
      a cavity formed in a space differential between the downward sloped first top surface and the downward sloped second top surface; and
      a curved rear wall defined at an inward most portion of the cavity and configured in combination with the cavity to stop a chair leg from further movement when placed within the chair wedge, wherein the curved rear wall is at a generally right angle relative to the second tier;
      a first tier inner left sidewall and a first tier inner right sidewall which both extend from the curved rear wall to the common axis and taper in height as they approach the common axis;
   placing a chair wedge under a chair leg in a stacked formation, such that the chair wedge aids in the prevention of chair falls.

18. The method of claim 17, further comprising:
utilizing a pair of chair wedges that are tethered one to another;
placing a first chair wedge under a first chair leg in a stacked formation, such that the chair wedge aids in the prevention of chair falls; and
placing a second chair wedge under a second chair leg in a stacked formation, such that the chair wedge aids in the prevention of chair falls.

\* \* \* \* \*